US006277510B1

(12) United States Patent
Chang et al.

(10) Patent No.: US 6,277,510 B1
(45) Date of Patent: Aug. 21, 2001

(54) POROUS ELECTRODE USED FOR CONDUCTIVE MATERIAL-FILLED POLYMER COMPOSITE

(75) Inventors: Kun-Huang Chang, Hsinchu; Wei-Wen Yeh, Kaoshiung; Shu-Chin Chou, Hsinchu Hsien; Chen-Ron Lin, Hsinchu, all of (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/479,971

(22) Filed: Jan. 10, 2000

(30) Foreign Application Priority Data

Jul. 30, 1999 (TW) .............................................. 088112988

(51) Int. Cl.[7] ...................................................... H01M 8/10

(52) U.S. Cl. ................................ 429/30; 429/33; 429/40; 429/42; 429/44; 204/290.03; 204/290.05; 204/291; 204/292; 204/293; 205/205; 205/219; 205/232; 205/236; 205/245; 205/246; 205/261; 205/271; 205/273

(58) Field of Search ..................................... 219/241, 253; 429/40, 42, 44, 33, 30; 204/290.03, 290.05, 291, 292, 293; 428/457, 458, 460, 462; 205/205, 219, 232, 236, 245, 246, 261, 271, 273

(56) References Cited

U.S. PATENT DOCUMENTS 4,689,475 8/1987 Kleiner et al. ........................ 219/553
4,800,253 1/1989 Kleiner et al. ........................ 219/553

FOREIGN PATENT DOCUMENTS

WO 96/36057 11/1996 (WO) .

*Primary Examiner*—Bruce F. Bell
(74) *Attorney, Agent, or Firm*—Ladas & Parry

(57) ABSTRACT

The present invention provides a porous electrode used for a conductive material-filled polymer composite. At least one surface of the porous electrode is an open porous structure, which includes a plurality of macropores and micropores randomly distributed and interconnected with each other. The conductive material-filled polymer composite includes a polymer substrate and conductive particles filled therein. When the surface of the open porous structure of the porous electrode is bonded with the conductive material-filled polymer composite, the conductive particles in the conductive material-filled polymer composite can be trapped in the macropores of the porous structure, and the polymer substrate in the conductive material-filled polymer composite can be immersed into the micropores of the porous structure. This enables a better direct contact between the conductive particles and the porous electrode. There is good adhesion strength between the porous electrode and the conductive material-filled polymer composite, and the interfacial resistance is decreased.

12 Claims, 2 Drawing Sheets

POROUS ELECTRODE USED FOR CONDUCTIVE MATERIAL-FILLED POLYMER COMPOSITE

BACKGROUND OF THE INVENTION

1. Field of the Invention

The present invention relates to a porous electrode, and more particularly to a porous electrode used for conductive material-filled polymer composite.

2. Description of the Prior Art

Conductive material-filled polymer composites are well-known and include a polymer substrate and conductive particles that are filled in the polymer substrate. Since they have good electrical physical properties and a wide range of processability, conductive material-filled polymer composites are often used as conductive material for various resistors and positive temperatuve coefficient (PTC) passive devices. The conductive particles filled include carbon black, nickel powders, silver powders, and graphite. Due to limitations on conductivity, wear resistance, and soldering problems, a metal electrode should be bonded onto the surface of the conductive material-filled polymer composite; thus, it is more convenient to undergo the subsequent processing on the passive device.

FIG. 1 shows the bonding situation of two conventional metal electrode layers and a conductive material-filled polymer composite. The conductive material-filled polymer composite 10 is sandwiched between two metal electrode 11 layers. The surface 12 of the metal electrode 11 contacting the conductive material-filled polymer composite 10 is smooth.

When such a smooth metal electrode is bonded to the conductive material-filled polymer composite, the following problems arise. The difference of the thermal expansion coefficient between the metal electrode and the conductive material-filled polymer composite will induce poor adhesion between them. When the conductive material-filled polymer composite is utilized for various resistors and PTC passive devices, it encounters various cyclic or non-cyclic temperature changes; therefore, the adhesion requirements of the metal electrode will become even more critical. In addition, the interfacial resistance between the conductive material-filled polymer composite and the metal electrode is also a problem. Since the conductive material-filled polymer composite is composed of conductive particles and insulate polymer substrate, during the process of bonding the metal electrode to the conductive material-filled polymer composite, the insulate polymer substrate may flow and fill into the space between the metal electrode and the conductive particles. This will induce the increase of the interfacial resistance, thus affecting the electrical properties of the conductive material-filled polymer composite after the electrode is bonded.

To solve the problem that the adhesion strength between the conductive material-filled polymer composite and the metal electrode is poor, the concept of roughing the metal electrode surface is first disclosed in U.S. Pat. No. 4,689,475 (Raychem Corporation). Referring to FIG. 2, a conductive material-filled polymer composite 20 is sandwiched between two electrode layers 21. The electrode layer 21 is contacted with the conductive material-filled polymer composite layer 20 by a rough surface 22. On the rough surface 22, there are a plurality of projections 23 with a height of 0.1 μm to 100 μm. In this manner, since the projections 23 on the rough surface 22 are inserted into the conductive material-filled polymer composite 20, the adhesion strength between the electrode 21 and the conductive material-filled polymer composite 20 can be increased.

In U.S. Pat. No. 4,800,253 (Raychem Corporation), the concept of U.S. Pat. No. 4,689,475 is further improved by a structure shown in FIG. 3. Referring to FIG. 3, a conductive material-filled polymer composite layer 30 is sandwiched between two electrode layers 31. The electrode layer 31 is contacted with the conductive material-filled polymer composite layer 30 by a rough surface 32. On the rough surface 32, there are a plurality of macronodules 33 with a height of 0.1 μm to 100 μm. On the macronodule 33, there are a plurality of micronodules 34 with a height of 0.5 μm to 2 μm. In this manner, since the macronodules 33 and the micronodules 34 on the rough surface 32 are inserted into the conductive material-filled polymer composite 30, the adhesion strength between the electrode 31 and the conductive material-filled polymer composite 30 can be further increased.

In WO 9636057, the electrode used to be contacted with the conductive material-filled polymer composite has an open type cellular structure, which can improve the adhesion strength between the electrode and the conductive material-filled polymer composite.

In the above-mentioned two Raychem patents, the adhesion strength between the metal electrode and the conductive material-filled polymer composite is improved by making the electrode rough to cause physical insertion between them. However, during the process of bonding the metal electrode and the conductive material-filled polymer composite, the insulate polymer substrate will still flow and fill into the space between the metal electrode and the conductive particles, which increases the interfacial resistance. As to WO 9636057, the direct contact between the conductive particles of the conductive material-filled polymer composite and the electrode still needs further improvement.

SUMMARY OF THE INVENTION

The object of the present invention is to solve the above-mentioned problems and to provide a porous electrode with a novel structure which can be used for conductive material-filled polymer composites. When the porous electrode of the present invention is bonded to a conductive material-filled polymer composite, the polymer in the conductive material-filled polymer composite can flow into the pores of the porous electrode. This will cause a three dimensional insertion structure and improve the adhesion strength between them.

Another object of the present invention is to make the conductive particles of the conductive material-filled polymer composite have a better direct contact with the porous electrode, thus decreasing the interfacial resistance.

A further object of the present invention is to provide an electrical device containing the above-mentioned porous electrode, which includes the porous electrode of the present invention and a conductive material-filled polymer composite layer bonded thereon. The electrical device has good adhesion strength and lower interfacial resistance.

To achieve the above-mentioned object, the porous electrode of the present invention used for a conductive material-filled polymer composite has a structure described below. At least one surface of the porous electrode is an open type porous structure, the porous structure including a plurality of macropores and micropores which are randomly distributed and interconnected with each other. The conductive material-filled polymer composite includes a polymer substrate and conductive particles filled therein.

When the surface of the open type porous structure of the porous electrode is bonded with the conductive material-filled polymer composite, the conductive particles in the conductive material-filled polymer composite can be trapped in the macropores of the porous structure, and the insulate polymer substrate in the conductive material-filled polymer composite can be immersed into the micropores of the porous structure so as to enable a direct contact between the conductive particles and the porous electrode.

DETAILED DESCRIPTION OF THE INVENTION

Figure 1:
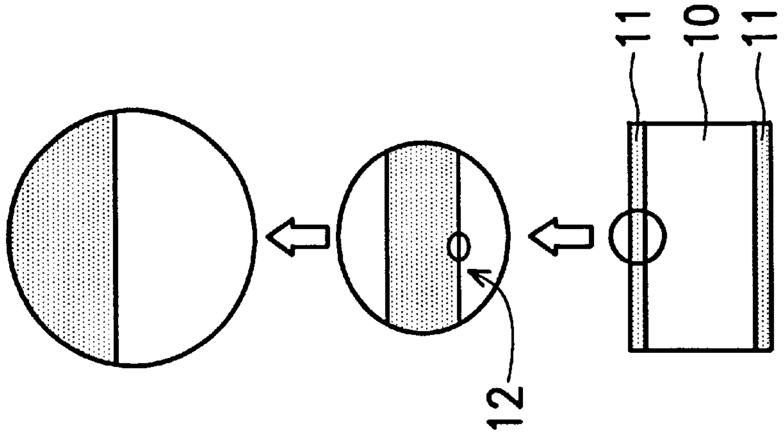
FIG. 1 (PRIOR ART)
FIG. 1 shows the structure of a conventional metal electrode which has a smooth surfuce.
Figure 2:
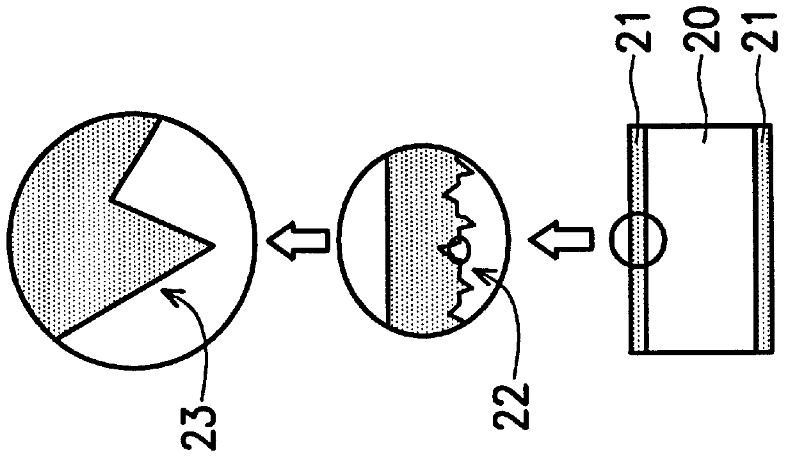
FIG. 2 (PRIOR ART)
FIG. 2 shows the structure of a conventional metal electrode which has a rough surface.
Figure 3:
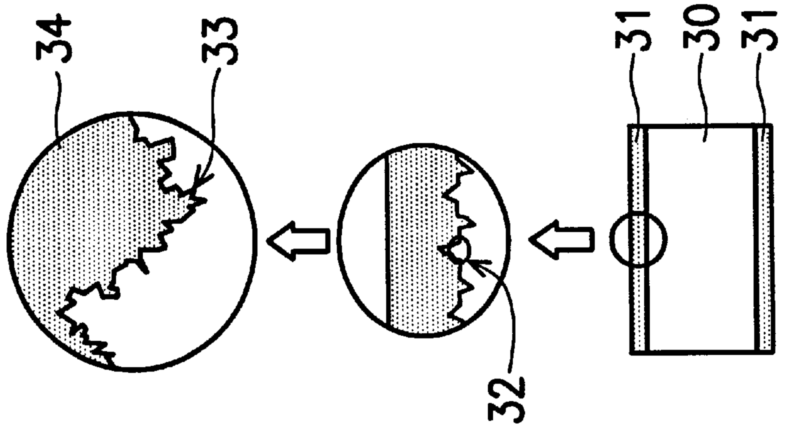
FIG. 3 (PRIOR ART)
FIG. 3 shows the structure of another conventional metal electrode which has a rough surface.
Figure 4A:
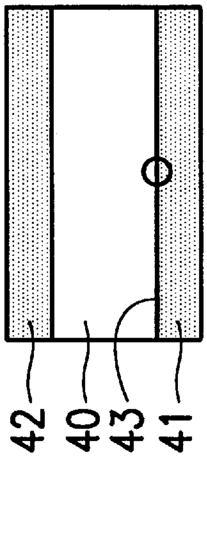
FIGS. 4*a*, 4*b*, and 4*c* show shows the structure of the porous electrode of the present invention, which has a surface of a porous structure.
Figure 4B:
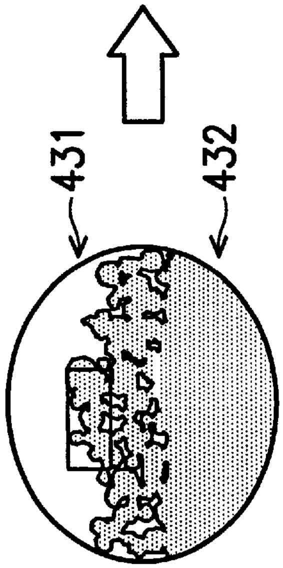
Figure 4C:
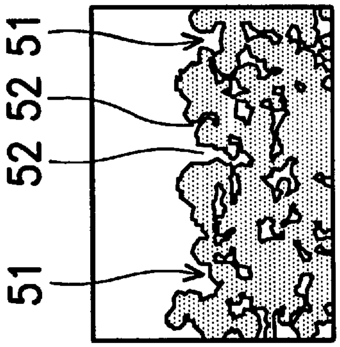

FIGS. 4*a*, 4*b*, and 4*c* show shows the structure of the porous electrode of the present invention, which has a surface of a porous structure. Referring to FIG. 4*a*, a conductive material-filled polymer composite layer 40 is sandwiched between two porous electrode layers 41 and 42. Referring to FIG. 4*b*, the surface 43 of the porous electrode 41 is an open type porous structure 431, and the portion under the open type porous structure 431 is a non-porous structure 432 (electrode substrate portion). Referring to FIG. 4*c*, the porous structure includes a plurality of macropores 51 and micropores 52 which are randomly distributed and interconnected with each other. The conductive particles in the conductive material-filled polymer composite 40 can be trapped in the macropores 51 of the porous structure, and the insulate polymer substrate in the conductive material-filled polymer composite can be immersed into the micropores of the porous structure. In this manner, the conductive particles and the porous electrode 41 can have a better direct contact, thus decreasing the interfacial resistance.

There are numerous methods of preparing a porous electrode having a porous structure on the surface. For example, the porous electrode can be prepared by subjecting an electrode substrate to composite electroplating, chemical etching, galvanic etching, or electroforming. The suitable electrode substrate can be nickel foil, nickel alloy foil, copper foil passivated with Ni—Zn, and copper foil passivated with Ni. When composite electroplating is used to prepare the porous electrode, the preferable electroplating solution is a nickel-containing electroplating solution.

For economic reasons, the electrode substrate can be made porous on only one surface, the portion under the surface remaining as the electrode substrate with no pores, as mentioned above. When bonding is conducted, the porous electrode should be bonded to the conductive material-filled polymer composite by the surface with the porous structure. However, if both of the surfaces of the electrode substrate are made porous, an electrode having two surfaces with porous structures can be obtained. In addition, the present invention also includes a porous electrode in which the entire electrode is porous, not only on the surface.

The conductive material-filled polymer composite suitable for use in the present invention can be any material having PTC (positive temperature coefficient) or ZTC (zero temperature coefficient) behavior. The polymer substrate in the conductive material-filled polymer composite can be thermoplastic polymer material, resin material, or thermosetting polymer material, such as polyethylene or fluorine-based polymer material. The conductive particle filled in the polymer substrate can be carbon black, graphite, metal powders, or metal-coated powders.

The main design feature of the present invention resides in that when the porous electrode of the present invention is bonded to a conductive material-filled polymer composite (as shown in FIGS. 4*a*, 4*b*, and 4*c*), to make the conductive particles have a better direct contact with the porous electrode, the size of the macropores 51 of the porous electrode should be controlled. The diameter of the macropore 51 on the porous electrode surface is preferably larger than the particle size of the conductive particles in the conductive material-filled polymer composite, and most preferably larger than that of the cluster formed from aggregation of the conductive particles. For example, when the diameter of the macropore 51 is design to be larger than ten times of the particle size of the conductive particle, then, the conductive particles and conductive clusters can be trapped in the macropores 51 of the porous electrode 41. This will make the the porous electrode have a better contact with the conductive particles, thus further decreasing the interfacial resistance. When the conductive particle is carbon black XC-72, the smallest particle dispersed in the conductive material-filled polymer composite is the primary aggregate which is formed from aggregation of the carbon black XC-72 primary particles, which has a particle size of 0.1 $\mu$m. The cluster formed from aggregation of the smallest dispersed particles may have a particle size of 0.5 $\mu$m to 1 $\mu$m. Therefore, when the conductive particle used in the conductive material-filled polymer composite is carbon black, the macropore of the porous electrode to be bonded is preferably has a diameter larger than 1 $\mu$m. Thus, the carbon black particles and clusters can be trapped in the macropore of the porous electrode, and the insulate polymer substrate in the conductive material-filled polymer composite 40 can flow into the micropores 52 of the porous electrode 41, so that the polymer substrate will not accumulate on the interface of the porous electrode and the conductive material-filled polymer composite. Therefore, the conductive particles and the electrode will have a greater chance of direct contact, which further decreases the interfacial resistance. Also, by means of the polymer substrate flowing into the micropores 52 of the porous electrode 41, the polymer substrate can form a three dimensional insertion structure with the electrode, which can in turn improve the interfacial adhesion strength between the electrode and the conductive material-filled polymer composite.

Another design feature of the present invention is described below. It is desired that the polymer substrate of the conductive material-filled polymer composite flows into the micropores 52 of the porous electrode. However, it is not desired that the conductive particles pass through the micropores 52. Therefore, the diameter of the micropore 52 of the porous electrode is preferably smaller than the particle size of the conductive particle, so that the conductive particle will not pass through the micropore 52.

Preferably, the porous structure of the porous electrode has a thickness that is larger than fifteen times, most preferably twenty times, the particle size of the conductive particle. Thereby, the porous electrode and the conductive material-filled polymer composite will have a better adhesion strength.

The following examples are intended to illustrate the process and the advantages of the present invention more fully without limiting its scope, since numerous modifications and variations will be apparent to those skilled in the art.

EXAMPLE 1

Preparation of the Porous Electrode

An electrode substrate was defatted, washed, and then immersed in a composite electroplating solution with a pH value of 3.5 to 4.5 to undergo composite electroplating. The amperage density was 3 A.S.D to 30 A.S.D., the electroplating time was 3 to 30 minutes, and the temperature of the electroplating bath was from room temperature to 60° C. After electroplating, the electrode was washed and dried, and an porous electrode was obtained.

The composite electroplating solution used included:

(1) nickel sulfamate bath, in which $[Ni^{+2}]$=10 g/l-100 g/l.

(2) suspended solid particles: carbon black, graphite, nickel powders, and nickel-coated graphite powders.

(3) boric acid, $[H_3BO_3]$=30 g/l-60 g/l.

EXAMPLE 2

Preparation of the Electrical Device Containing the Porous Electrode 70 weight part of high density polyethylene LH-606 (purchased from USI FAR EAST CORPORATION) and 30 weight part of conductive carbon black XC-72 (purchased from Cabot Company) were blended and extruded by a two screw extruder (ZSK25 form W&P Company, Germany) into plastic particles containing a conductive filler. The plastic particles were then mold pressed in a hot pressing machine at a molding temperature of 160° C. A cirular disc having a thickness of 1.0 mm and a diameter of 65.0 mm was obtained.

The porous electrode obtained from Example 1 was trimmed to a metal foil having a diameter of 65.0 mm. The conductive material-filled plastic composite disc was sandwiched between two metal foil and then mold pressed at a molding temperature of 160° C. to form an electrical device.

The electrical device containing the porous electrode was subjected to thermocycle test with an oven. One cycle was defined as maintaining the sample at 100° C. for 30 minutes and then maintaining it at room temperature for 15 minutes. The results show that after 100 cycles, the electrical device obtained does not warp or peel, indicating that the adhesion between the electrode and the conductive material-filled plastic composite is good.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. An electrode assembly comprising:

porous electrode, wherein at least one surface of the porous electrode is an open porous structure, the porous structure including a plurality of macropores and micropores which are randomly distributed and interconnected with each other, and conductive material-filled polymer composite comprising a polymer substrate with conductive particles therein, the surface of the open type porous structure of the porous electrode contacting the conductive material-filled polymer composite so that the conductive particles in the conductive material-filled polymer composite are trapped in the macropores of the porous structure, and the polymer substrate of the conductive material-filled polymer composite is immersed into the micropores of the porous structure so as to enable a better direct contact between the conductive particles and the porous electrode.

2. The electrode assembly as claimed in claim 1, wherein the diameter of the macropore is larger than ten times of the particle size of the conductive particle.

3. The electrode assembly as claimed in claim 1, wherein the diameter of the micropore is smaller than the particle size of the conductive particle, so that the conductive particle will not pass through the micropore.

4. The electrode assembly as claimed in claim 1, wherein the porous structure of the porous electrode has a thickness that is larger than twenty times of the particle size of the conductive particle.

5. The electrode assembly as claimed in claim 1, which is prepared by subjecting an electrode substrate to composite electroplating, chemical etching, galvanic etching, or electroforming.

6. The assembly as claimed in claim 5, wherein the electrode substrate is selected from the group consisting of nickel foil, nickel alloy foil, copper foil passivated with Ni—Zn, and copper foil passivated with Ni.

7. The electrode assembly as claimed in claim 5, which is prepared by subjecting the electrode substrate to composite electroplating.

8. The electrode assembly as claimed in claim 7, wherein the electroplating solution used for composite electroplating is a nickel-containing electroplating solution.

9. The electrode assembly as claimed in claim 1, wherein the conductive material-filled polymer composite has PTC or ZTC behavior.

10. The electrode assembly as claimed in claim 9, wherein the polymer substrate of the conductive material-filled polymer composite is thermoplastic polymer material, resin material, or thermosetting polymer material.

11. The electrode assembly as claimed in claim 10, wherein the polymer substrate is polyethylene or fluorine-based polymer material.

12. The electrode assembly as claimed in claim 10, wherein the conductive particle of the conductive material-filed polymer composite is selected from the group consisting of carbon black, graphite, metal powders, and metal-coated powders.

* * * * *